(12) United States Patent
Masuda et al.

(10) Patent No.: US 6,314,205 B1
(45) Date of Patent: Nov. 6, 2001

(54) METHOD AND APPARATUS FOR COMPRESSING AND TRANSMITTING A THREE-DIMENSIONAL GEOMETRIC MODEL

(75) Inventors: Hiroshi Masuda, Yamato; Masaki Aono; Ryutarou Ohbuchi, both of Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/119,691

(22) Filed: Jul. 21, 1998

(30) Foreign Application Priority Data

Jul. 23, 1997 (JP) .................................................. 9-196811

(51) Int. Cl.[7] .............................. G06K 9/36; G06F 15/00
(52) U.S. Cl. ........................................... 382/232; 345/440
(58) Field of Search .................................... 382/108, 103, 382/107, 153, 232, 233, 235, 236, 238, 240, 242, 243, 247, 248; 345/419, 420, 443, 440, 118, 441, 121, 427; 358/1.15

(56) References Cited

U.S. PATENT DOCUMENTS

| | | | |
|---|---|---|---|
| 5,684,725 | * 11/1997 | Numao et al. ............................ | 703/2 |
| 5,745,117 | * 4/1998 | Masuda et al. ......................... | 345/420 |
| 5,825,369 | * 10/1998 | Rossignac et al. .................... | 345/440 |
| 5,905,507 | * 5/1999 | Rossignac et al. .................... | 345/440 |
| 5,929,860 | * 7/1999 | Hoppe .................................... | 345/419 |
| 6,078,330 | * 6/2000 | Masuda et al. ......................... | 345/420 |

OTHER PUBLICATIONS

SIGGRAPH '95 Course Notes, "Wavelets and their Applications in Computer Graphics" Alain Fournier, University of British Columbia.

\* cited by examiner

Primary Examiner—Jose L. Couso
Assistant Examiner—Duy M. Dang
(74) Attorney, Agent, or Firm—Louis J. Percello (57) ABSTRACT

A data compression method for processing topological structures of various geometric models. A topological transformation is performed for a three-dimensional (3D) geometric model that is to be compressed, and a triangle mesh is generated. A conventional triangle mesh compression method is employed. Associated data required for the performance of a reverse operation for the topological transformation are prepared. As a result, topological data for the 3D geometric model is compressed. As needed, the data for the compressed triangle mesh and associated operation data are output. Furthermore, a necessary process (e.g., a compression process) is also performed for geometric data for the 3D geometric model, and the resultant data are either stored or output. For the decompression of compressed data, the compressed triangle mesh is decompressed using the method employed for compression, and a triangle mesh is generated. The associated data are then employed to perform the reverse operation for the topological transformation of the triangle mesh, and the topological data for the original 3D geometric model are recovered. If the geometric data are also compressed, they are decompressed and are employed with the topological data to recover the 3D geometric model.

15 Claims, 7 Drawing Sheets

METHOD AND APPARATUS FOR COMPRESSING AND TRANSMITTING A THREE-DIMENSIONAL GEOMETRIC MODEL

BACKGROUND OF THE INVENTION

1. Field of the Invention

The present invention relates to the compression and transmission of three-dimensional geometric models.

2. Description of the Related Art

The introduction of three-dimensional (3D) CAD system have been widely adopted by many manufacturing companies. The use of such systems requires greater data handling capabilities in quantities ranging from several hundred MB to several GB. Moreover, the 3D CAD systems have been used in collaborative, concurrent design processes in a network environment. Therefore, the length of the period of time required for the transfer of CAD data across a network and for the display of the CAD data is important. The importance of this time period will increase as the use of 3D CAD is expanded in the future. The transfer of product data is also being discussed by ISO STEP and CALS.

In order to rapidly transfer and display a solid model and surface model which are created using the 3D CAD system, data for the models may be compressed. However, the compression of solid models and surface models, which include holes and which may include a face whose boundary consists of an edge and a vertex or a face whose boundary consists of two edges and two vertexes, has not been studied much. On the other hand, various compressions of triangle mesh models have been studied.

To express a triangle mesh model, usually n vertex coordinates and three vertex indexes per one triangle are required. First, an explanation will be given only for topological data, i.e., information concerning how n received vertexes are linked together to form a triangle. In the ordinary expression, assuming the number of triangles in an n-vertex mesh model is 2n, the quantity of data required for expressing a triangle is $6\log 2n$ bits.

Figures 11A, 11B:
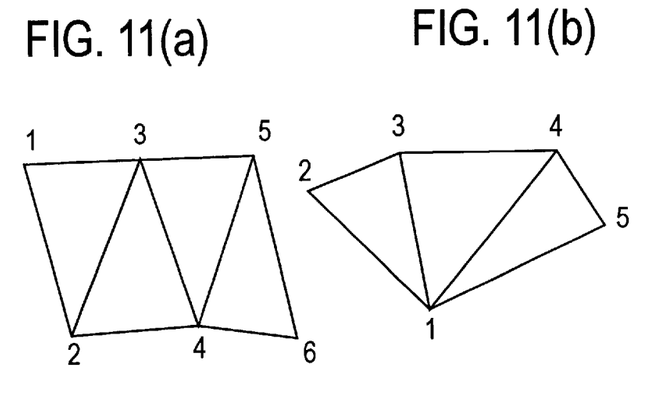

The reference "OpenGL Programming Guide," J. Neider, T. Davis and M. Woo, Addision-Wesley, 1993 describes APIs, a triangle strip and a triangle fan as methods for rapidly transferring a triangle. These methods are employed to express vertexes for triangles having fewer processes than have those for which the vertexes are held separately. As shown in FIG. 11($a$), for the triangle strip, vertexes are provided in a zigzag fashion. On the other hand, as shown in FIG. 11($b$), for the triangle fan, vertexes are provided like a fan. In a triangle strip consisting of n triangles, the number of vertex coordinates to be transmitted is reduced from 3n to (n+2), and if vertexes are expressed by indexes, the quantity of data is $2(n+2)\log_2 n$ bits.

In "Geometry Compression," M. Deeling, SIGGRAPH '95, 1995, a generalized triangle strip by which the quantity of data is further reduced. According to this method, a buffer for 16 vertex coordinates is provided and topological control code is transmitted, so that a long generalized strip can be created having mixed properties, incorporating those of the triangle strip and the triangle fan. The quantity of data is approximately ($\frac{1}{8}n\log_2 n+Sn$) in a case where there are n vertexes.

In "Geometric Compression Through Topological Surgery," G. Taubin, IBM Research Report RC-20340, January 1996, there is disclosed a method for expressing a triangle mesh using a vertex spanning tree (a tree for tracing all the vertexes using a mesh model) and a triangle tree (a tree structure formed of the previously mentioned triangle strip). According to this method, in an ideal case, one triangle can be expressed by one bit and the topology of a mesh model can be expressed by a total of $2(2\log_2 n+2n)$ bits. An ideal case means a case where the entire mesh model constitutes a single triangle strip. Since the triangle tree is uniquely determined by the vertex spanning tree, the actual quantity of data depends on whether a spanning tree can be acquired whereby the longest triangle strip can be provided. Although the search for the optimal solution is an NP complete problem, by using a method for searching for the approximate solution, data can be compressed considerably more than it can by using a conventional method.

The above described methods are provided for a triangle mesh model. When only a triangle mesh model is a target, the following problems arise.

Figure 12A:
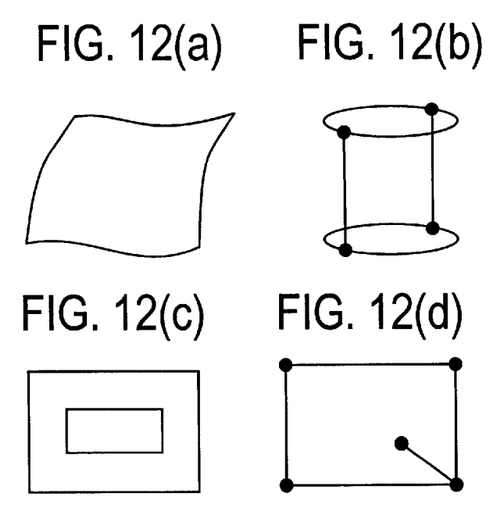

(1) Although a triangle mesh model is a presentation that is easily handled by hardware and is optimal for a high speed display, the quantity of data for a curved surface model, however, becomes enormous. If a model in FIG. 12($a$) describing a free curved surface is approximated to triangles so that the error from the original curved surface is 10~ or less, very many triangles are required and the quantity of data is increased by one or more digits. It is inconvenient to employ an excessively increasing quantity of triangle mesh data for a high speed transfer, and in this case, a curved surface model should be transmitted unchanged. The above references do not provide any solutions for this problem.

(2) Although the largest market for the geometric model is the manufacturing industry, a triangle mesh model cannot adequately cope with this field. A CAD model that is popular with the manufacturing industry employs a manifold as a defined region (the term "manifold" is usually interpreted to mean a "closed" manifold that is the domain of a solid model, in this case a manifold "having boundaries" is also included). Therefore, the topology shown in FIGS. 12($b$), ($c$) and ($d$) exists, and a compression method for a triangle cannot be employed for them.

Since in many cases the quantity of data for a 3D geometric model is large, transferring data takes a great deal of time. According to the conventional technique, the 3D model cannot be displayed at a transfer destination unless the transferring of all the data has completed. However, if a display is provided based on a data transfer by sequentially using only data that is received, an approximate understanding of the shape of the 3D geometric model can be obtained during the transfer of data, and the transfer of data may be halted during the transfer process.

Figures 13A, 13B:
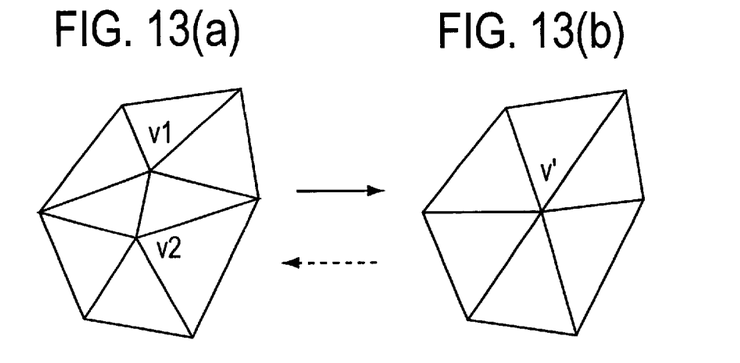

The technique described "Progressive Mesh," H. Hoppe, SIGGRAPH '96, 1996 is known as a related technique. This technique employs a mesh simplification method used in LOD ((Level Of Detail) or Multiresolution)). According to the mesh simplification method, vertexes at both edges are fused to reduce the number of triangles. This processing is shown in FIG. 13. The simplification process proceeds from FIGS. 13($a$) to 13($b$) (the designated solid line arrow), and vertexes vi and v2 in FIG. 13($a$) are fused to serve as v' in FIG. 13($b$). A process proceeding from FIGS. 13($b$) to 13($a$) (indicated by a broken line arrow) is shown as a progressive display process. This process is performed by simultaneously transferring coordinate data and topological data for changing the level of detail. The method described in Mesh is closely related to a triangle mesh, and has the conventional problem described above for topological data compression.

SUMMARY OF THE INVENTION

To resolve these and other problems, it is one object of the present invention to perform lossless data compression for a 3D geometric model that includes a solid model and a surface model.

It is another object of the present invention to provide a data compression method for topological structures of various geometric models.

It is an additional object of the present invention to enable the high speed transfer of the geometric data and the reduction of the disk memory capacity required for the storage of geometric data.

It is a further object of the present invention to enable the progressive transfer (display) of a 3D geometric model.

According to the present invention, a topological transformation is performed for a three-dimensional (3D) geometric model that is to be compressed, and a triangle mesh is generated. Since the triangle mesh is generated, the triangle mesh compression method, as described above is employed. Associated data required for the performance of a reverse operation for the topological transformation are prepared. As a result, topological data for the 3D geometric model is compressed. As needed, the data for the compressed triangle mesh and associated operation data are output. Furthermore, a process (e.g., a compression process) is also performed for geometric data for the 3D geometric model, and the resultant data are either stored or output.

For the decompression of compressed data, the compressed triangle mesh is decompressed using the method employed for compression, and a triangle mesh is generated. The associated data are then employed to perform the reverse operation for the topological transformation of the triangle mesh, and the topological data for the original 3D geometric model are recovered. If the geometric data are also compressed, they are decompressed and are employed with the topological data to recover the 3D geometric model.

To perform a progressive transfer, the hierarchical expressions for the vertex coordinates, the curved line and the curved surface are generated. For example, a set P of coordinate values, $P=\{pI, \ldots, pN\}$ (N is the number of coordinate values), is expressed as $=P^{(n)}=f_P(P^1, \ldots, P^n)$ (P indicates data at level k, and $P^{(n)}$ indicates a coordinate value obtained when data at the nth level are transmitted). Similarly, a set of coordinate values for a curved line, $C=\{cjj\}$, and a set of coordinate values for a curved surface, $S=\{sk\}$, are expressed as $C^{(n)}=f_x(C^1, \ldots, C^{(n)}$ and $S^{(n)}=f_S(S^1, \ldots, S^n)$.

According to the present invention, any hierarchical method can be employed, and, for example, refer to "Wavelets And Their Applications In Computer Graphics," A. Fournier, SIGGRAPH '95 Course Notes, 1995 (which is incorporated herein by reference). The geometric data is sequentially employed beginning at level 1 (at the highest position) together with the topological data described above to display a 3D geometric model for each level. As a result, a geometric model can be displayed step-by-step that ranges from low precision to high precision.

According to the above and other objects of the present invention, a method for transmitting 3D geometric model, includes the steps of:

performing a topological transformation for topological data for each face of a 3D geometric model and generating a triangle mesh, compressing the triangle mesh to generate compressed topological data, generating operation data associated with the performed topological transformation; and transmitting the compressed topological data and the operation data.

The method for transmitting a 3D geometric model, further includes a step of transmitting geometric data for the 3D geometric model. It is possible to either transmit the compressed topological data and the geometric data together, little by little, or to first transmit all the compressed topological data and then all the geometric data. After the geometric data has been compressed it may be transmitted.

The operation data may include data for edges and vertexes that are added by the topological transformation. This is because at decompression the edges and the vertexes that were added must be deleted by using these data.

In addition, the topological transformation includes the steps of: registering edges if the edges are added during the topological transformation, registering vertexes if the vertexes are added during the topological transformation, and registering edges and vertexes for an external loop if a loop in a face is linked with the external loop. The topological transformation includes an operation for adding a vertex to an edge, an operation for adding an edge and deleting a loop, and an operation for adding an edge to divide a surface into triangles.

The step of generating the operation data includes the steps of: making an ID for an edge in the generated triangle mesh identical to an ID for a registered corresponding edge, and making an ID for a vertex in the generated triangle mesh identical to an ID for a registered corresponding vertex. The ID in the triangle mesh that is referred to in the decompressed triangle mesh, and is more convenient to manage the edges etc. based on the ID.

The method for transmitting a 3D model also includes a step of providing indexes to edges and vertexes in order in which the edges and vertexes are generated when the compressed topological data is decompressed to the triangle mesh. The order of the generation when the decompression is performed varies depending on the method used to compress the topological data.

The step of transmitting the geometric data includes the steps of: transmitting geometric data for vertexes, except for those added during the topological transformation, in order in which the vertexes are generated when the compressed topological data is decompressed to the triangle mesh, and transmitting geometric data for edges, except for those added during the topological transformation, in order in which the edges are generated when the compressed topological data is decompressed to the triangle mesh. Each time the topological data is decompressed, the geometric data for that element is assigned, so that a high speed display process can be performed.

The step of transmitting the geometric data may include the steps of generating hierarchical expressions of the geometric data, and transmitting the geometric data at each level from the geometric data at the highest level to that at the lowest level. As a result, a progressive transfer can be performed.

The above explanation applies to the processing performed by the side that transmits a 3D geometric model. The processing performed by the side that receives the 3D geometric model includes the steps of: decompressing compressed triangle mesh data to generate a triangle mesh, performing a reverse operation of a topological transformation by employing operation data associated with the topological transformation performed for each face of the 3D geometric model, and generating topological data for each face of the 3D geometric model; generating the 3D geometric model by using the geometric data of the 3D geometmodel and the generated topological data, and displaying the 3D geometric model. The compressed triangle mesh, the operation data and the geometric data that are stored in a storage unit may be effective for reducing the storage size as well as the data that are transmitted.

The reverse operation of the topological transformation also includes a process for deleting an edge if it is added and a process for deleting a vertex if it is added. The original 3D geometric model can be recovered by processing the edges and the vertexes.

In order to perform a progressive display, the step of generating the 3D geometric model includes the steps of: extracting the hierarchical geometric data at each level from the geometric data at the highest level to that at the lowest level, and generating the 3D geometric model by using the geometric data at levels that have been extracted and the topological data.

The 3D geometric model transmission method described above is understood as a method for compressing a 3D geometric model.

The present invention is also directed to an apparatus for implementing the above method in the form of a computer program. With the present invention realized as a computer program, one of ordinary skill in the art would realize that the computer program can be stored on a storage medium, such as a CD-ROM or a floppy disk.

BRIEF DESCRIPTION OF THE DRAWINGS

FIGS. 11(a) and (b) show diagrams for explaining compression examples for a triangle mesh.

FIGS. 12(a) to (d) illustrate diagrams showing example objects that cannot be processed by using a triangle mesh model.

FIGS. 13(a) and (b) are diagrams for explaining background art.

DETAILED DESCRIPTION OF A PREFERRED EMBODIMENT

A. Processing Topological Data of a 3D Geometric Model

Figure 1:
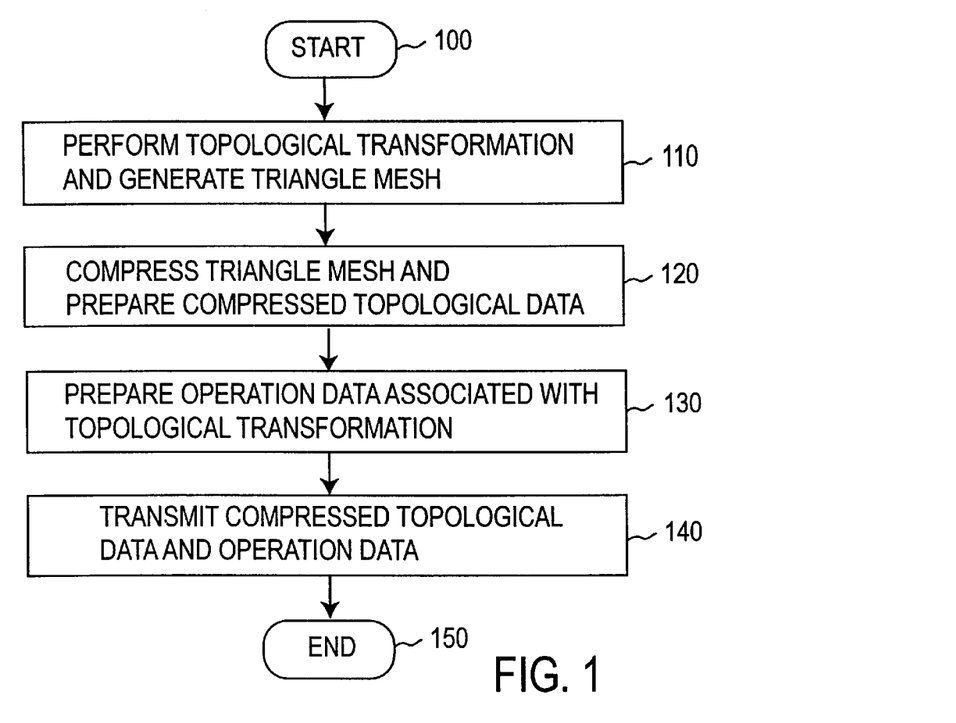
FIG. 1 illustrates a flowchart for explaining the transmission of topological data.
Figure 2:
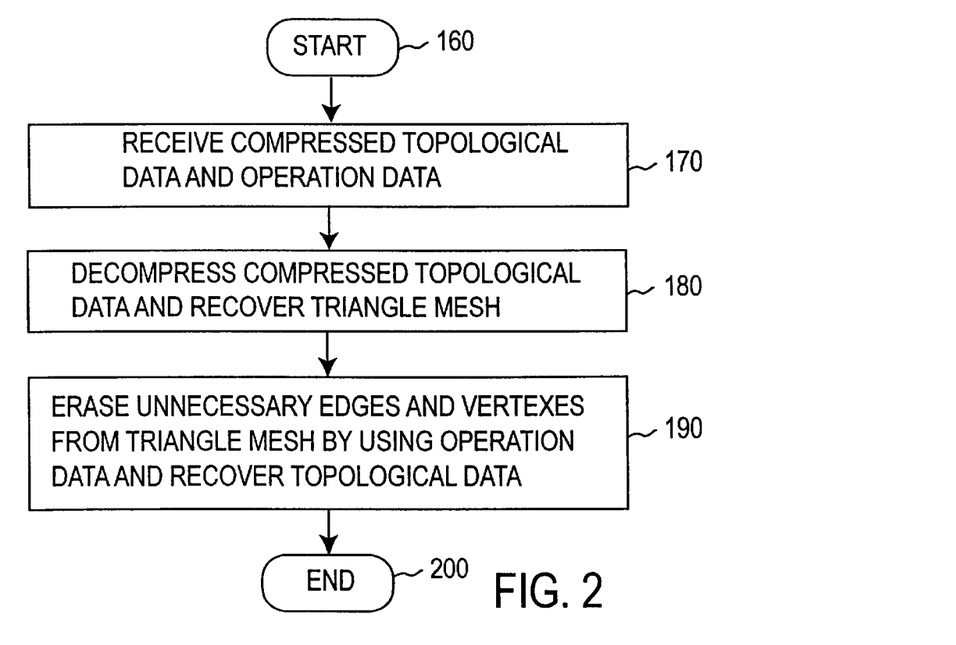
FIG. 2 shows a flowchart for the processing after the topological data have been received.

According to the present invention, topological data of a 3D geometric model is processed as shown in FIGS. 1 and 2. First, with reference to FIG. 1, a topological transformation is performed for topological data of a 3D geometric model to generate a triangle mesh (step 110). The triangle mesh is compressed using a conventional method, to generate compressed topological data (step 120). Then, operation data associated with the topological transformation is prepared (step 130). The process at step 130 may be performed at the same time as the process at step 120. Finally, the compressed topological data and the operation data are transmitted (step 140).

FIG. 2 illustrates an opposite process, where the compressed topological data and the operation data are received (step 170), following which the compressed topological data is decompressed to recover a triangle mesh (step 180). Then, an operation, such as the deletion of unnecessary vertexes and edges, is performed for the recovered triangle mesh by using the operation data, and the topological data is recovered (step 190). The individual steps will now be explained in detail.

A1. Topological Transformation

This process is performed to generate a triangle mesh. However, unlike a common triangle mesh, only a topological structure need finally be reproduced, and the matching of topology and geometry is not required for a triangle mesh, which is intermediate data. Therefore, a triangle division method is employed for which no information concerning coordinate values is used. Since no geometric calculations using coordinate values are performed, great effects are obtained in that the triangle division is processed at high speed, and in that the triangle division is performed certainly without being affected by a coordinate value error. The topological transformation is performed for each face of a 3D geometric model, as shown in FIG. 3.

Figure 3:
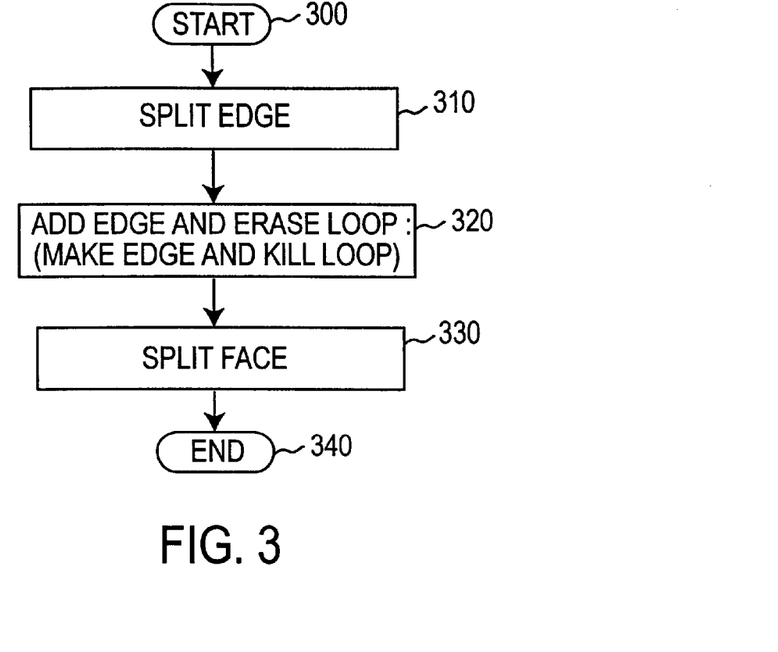
FIG. 3 shows a flowchart for explaining a topological transformation.

(a) Split Edge (step 310 in FIG. 3)

Figure 4A:
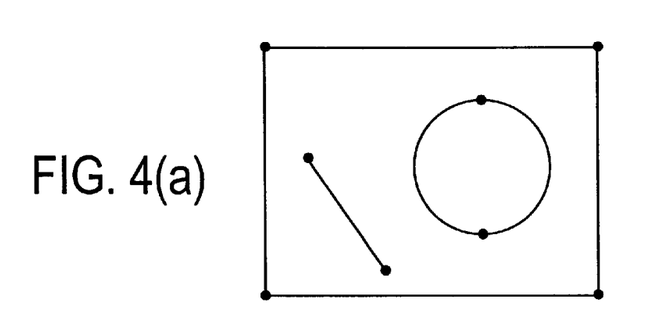
FIGS. 4(a) and 4(b) illustrate a diagram for explaining the topological transformation.
Figure 4B:
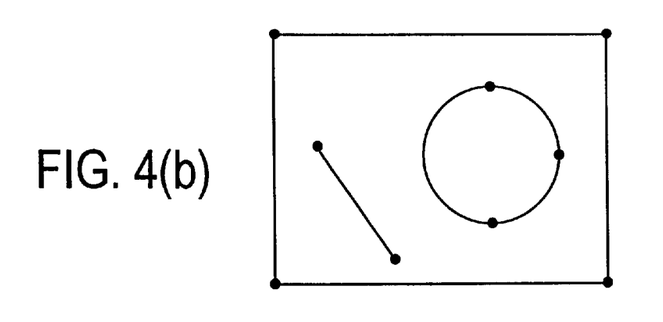

When one or two edges constitute a closed loop, as shown in FIG. 4(a), the loop is split into three edges. At this time, the ID of a vertex that is added to split the edge is registered in a vertex ID table. The vertex ID table is used to store new vertexes that are added. When a vertex is added to the object in FIG. 4(a), the resultant object is as shown in FIG. 4(b). The vertex that is added to the loop is stored in the vertex ID table.

(b) Make Edge and Kill Loop (step 320 in FIG. 3)

Figure 5A:
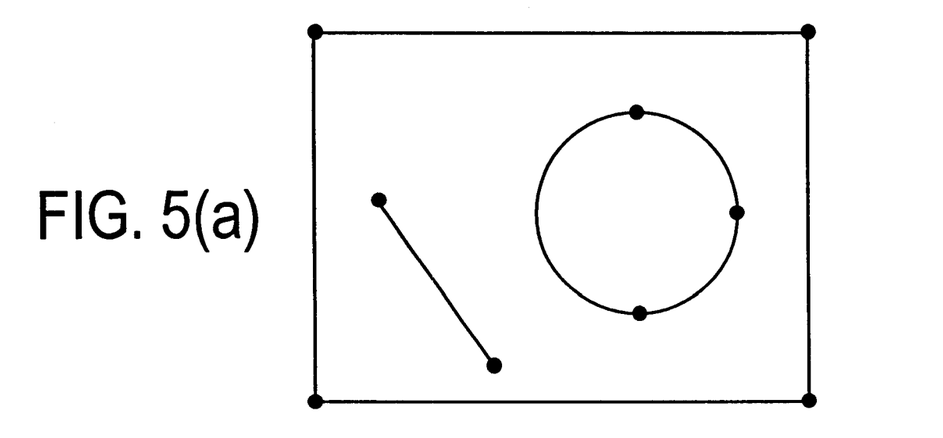
FIGS. 5(a) and 5(b) show a diagram for explaining the topological transformation.

When two or more loops are present as shown in FIG. 5(a) (the same as in FIG. 4(b)), an edge is added to link the loops. The ID of the added edge is registered in an edge ID table. When the loops are linked together, the ID of one edge on the external loop and the ID of a vertex that is a starting point for following the loop counterclockwise are registered in a loop table. This is done so that information concerning which loop is external is available and the added edges are deleted and the loop is again split into two. Any edge may be registered, and the counterclockwise starting point is merely one example. In the case in FIG. 5(a), first, edges e1 and e2 are added to link the loops, and the edges e1 and e2 are registered in the edge ID table. Edge e0 of the external loop and starting point v0 for the counterclockwise loop are registered in the looptable.

(c) Split Face (step 330 in FIG. 3)

Figure 5B:
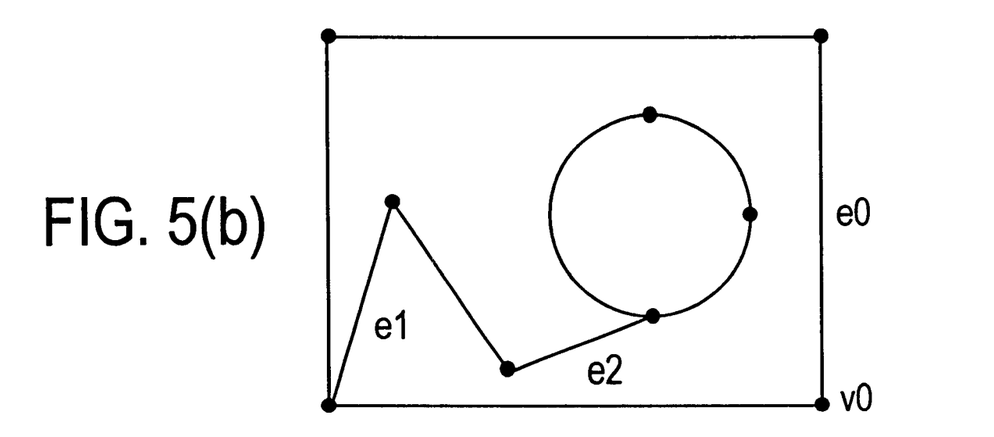
Figure 6A:
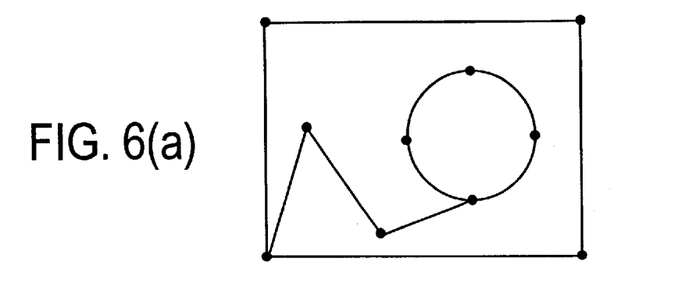
FIGS. 6(a) to 6(d) show diagrams for explaining the topological transformation.
Figure 6B:
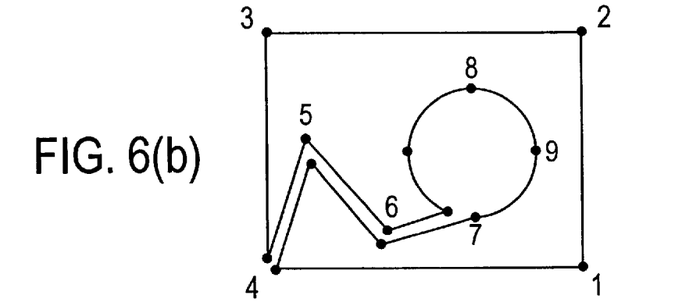
Figure 6C:
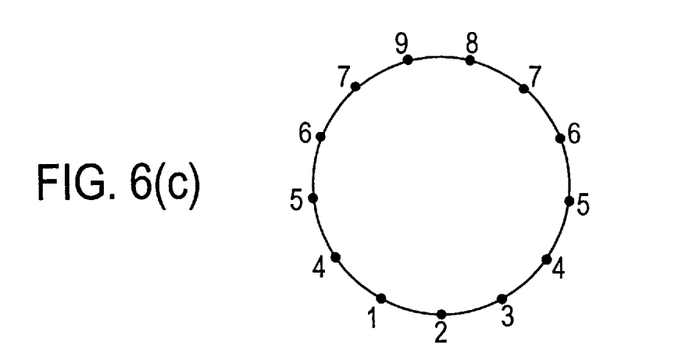
Figure 6D:
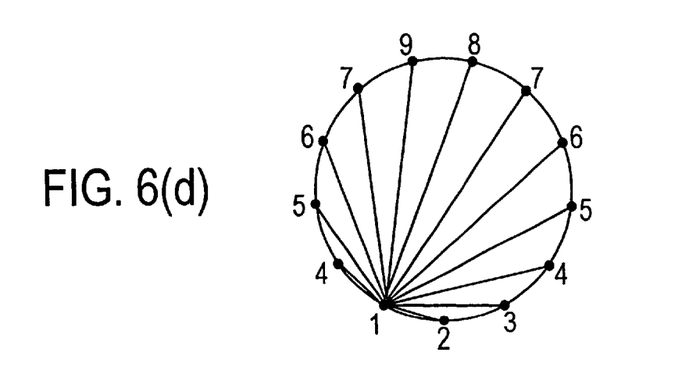

The object in FIG. 6(a) (the same as in FIG. 5(b)) is cut and opened as a linked loop, as shown in FIG. 6(b). A vertex ID will be provided for the explanation described later. At this time, the object in FIG. 6(b) is the same as that in FIG. 6(c), topologically, and is regarded as a polygon as shown in FIG. 6(c). The polygon is divided into triangles by adding new edges (FIG. 6(d)). The IDs of the added edges are registered in the previously mentioned edge ID table. The triangle mesh shown in FIG. 6(d) is not embedded in euclidean space, but topological matching is acquired.

As an exception process, (1) when the same vertex among the three forming a triangle is employed two times or more, or (2) when all three vertexes of two different triangles match, the topology cannot be handled by using a triangle mesh model, and a vertex is added to repeat triangle division. The ID of the added edge is registered in the edge ID table. Although the ID of the vertex added is registered in the vertex ID table, when a vertex is added to an edge (added edge) that has its ID stored in the edge ID table, the ID of the vertex may not be registered in the vertex ID table.

The above processes (1) to (3) are performed for the topological transformation for the generation of a triangle mesh.

A2. Compression of Triangle Mesh

The present invention employs a conventional method for compressing a triangle mesh. The processing for this invention can be performed by, for example, any of the methods described above, or by other well known methods. According to the present invention, only a process for preparing operation data, which will be described below, depends on the method employed for compressing a triangle mesh. The data for a compressed triangle mesh is referred to as compressed topological data.

A3. Preparation of Operation Data

Data for which vertexes and edges were added is required to decompress the triangle mesh to recover the original topological data. Thus, data stored in the vertex ID table, the edge ID table and the loop table, which are prepared by the above described topological transformation, are necessary. However, since the IDs in each table created by the topological transformation are only those provided before data compression, data indicating which vertexes and edges carry which IDs will be lost when the data are compressed. Therefore, during the preparation of the operation data, a process is performed to obtain correspondence between the IDs for vertexes and edges provided during decompression of compressed topological data and the IDs stored in the tables.

As one example, because the compressed topological data are decompressed using a method that corresponds to the method for compressing the triangle mesh, indexes are provided for vertexes and edges in order in which they are recovered during the decompression. Although indexes are provided for faces, they are not employed for preparing the operation data. Based on the correspondence of these indexes and the IDs that are provided before the data compression, the IDs in the tables are replaced with the indexes. The tables, in which the ID entries have been replaced by the indexes, are used as the operation data.

There are other methods that can be employed for the provision of indexes. For example, the index for an edge may be provided by using the indexes at vertexes on both sides of the edge. Any other method may be employed so long as correspondence between the indexes and the IDs in a table can be easily obtained during decompression.

Since a smaller quantity of operation data is preferable, the following additional process may be performed. It should be noted that in this case n denotes the number of vertexes for a triangle mesh model, the number of edges is 3n and the number of faces is 2n. In addition, assume that I(x) is the smallest integer and that it is not smaller than x.

(a) When the number of elements in the vertex ID table is $n_x$, the size of the table $(n_x+1)I(\log_2 n)$ is compared with the vertex count n. When the size of the table is smaller, the indexes in the table are listed unchanged. In the other cases, one bit indicating whether a vertex is included in the table is prepared for n vertexes. Then, one bit indicating which datum is selected, either the table or the n vertexes, is added (actually, cases wherein the vertex count is the smaller seldom occur).

(b) When the number of elements in the edge ID table is $n_x$, the size of the table $n_e I(\log_2(3n))$ is compared with the edge count 3n. When the size of the table is smaller, the indexes in the table are listed unchanged. In the other cases, one bit indicating whether or not an edge is included in the table is prepared for 3n edges. Then, one bit indicating which datum is selected, either the table or the 3n edges, is added.

(c) The direction of the edge in a loop is first determined to describe the loop table. The direction of an edge is defined as the one in which the indexes of the vertexes at both end points of the edge ascend. The information for the edges and vertexes stored in the loop table are expressed by edges and a flag (a flag indicating whether or not a vertex is a starting point in the direction determined as above). When the number of elements in the loop table is $n_1$, the size of the table, $n_1 (I+I(\log(3n)))$, is compared with the sum $3n+n_1$. When the former is smaller, the indexes are listed. In the other cases, one bit indicating whether an edge is included in the loop table is prepared for each edge (actually, cases wherein $3n+n_1$ is the smaller seldom occur).

A4. Transmission

Since geometric data is not taken into account here, the compressed topological data and the operation data that have been prepared as explained above are transmitted. These data, however, may be stored instead of being transmitted. Since the transmission and storage processes for these data are the same as the conventional ones, no further explanation for them will be given.

A5. Reception

Since the process for receiving the above described data across a network and the process for reading data stored in the storage unit are the same as the conventional ones, no further explanation for them will be given.

A6. Recovery of Triangle Mesh

A decompression process corresponding to the above compression process may be performed for recovering a triangle mesh from compressed topological data. Since any compression process can be employed, any decompression process can be used so long as it corresponds to the compression process. However, if a transmission source has a variety of compression processes, the transmission source should notify a transmission destination for data regarding which compression process was performed. When a triangle mesh is recovered, indexes are provided for individual edges and vertexes. If the index provision method can be selected by the transmission source, the transmission source should notify the transmission destination which index provision method that was employed.

Figure 7:
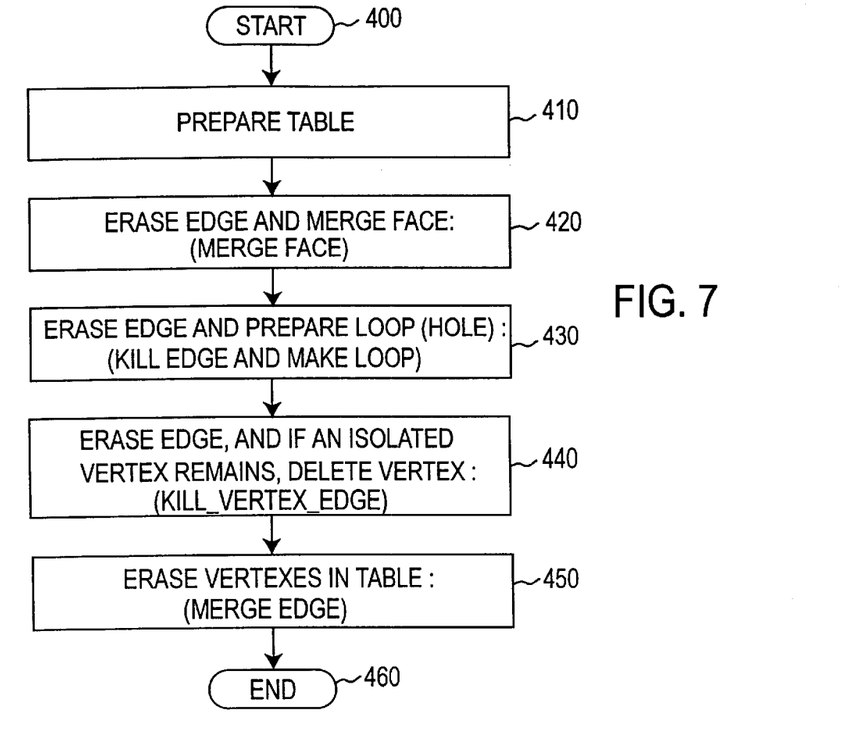
FIG. 7 illustrates a flowchart for explaining a reverse operation of the topological transformation.

A7. Recovery of Topological Data (FIG. 7)

(a) First, a vertex ID table, an edge Id table and a loop table are prepared from the received operation data (step 410). Since the lDs in the individual tables may be indexes, the received indexes are employed as tables. When bits indicating whether vertexes are included in a table are received by the equivalent count of the vertexes, corresponding indexes are entered in the table following the order in which the vertexes are included.

Figure 8A:
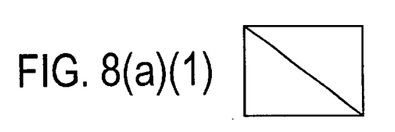
FIGS. 8(a) to 8(d) illustrate diagrams for explaining the reverse operation of the topological transformation.

(b) When an edge in the edge ID table is a boundary for two different faces (FIG. 8(a)), a mergeface operation is performed to erase the edge and unite the faces (step 420).

Figure 8B:
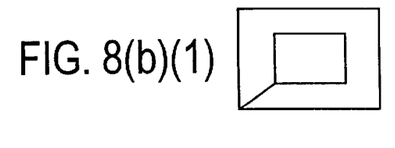
Figure 8C:
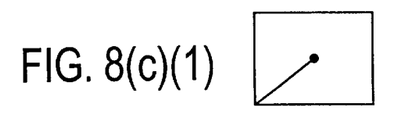
Figure 8D:
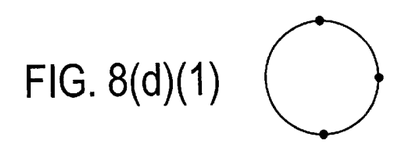

(c) When an edge in the edge ID table is used twice for the same face (FIG. 8(b)), a kill-edge&make-loop operation is performed to erase the edge and prepare a loop, which serves as a hole (step 430). When, as the result of examining the loop table, the edge in the loop, including the direction (the vertex being used as a starting point), is the same as the edge in the loop table, the loop is determined to be an external loop and the other loop is determined to be the hole of the external loop.

(d) If an isolated vertex is generated by erasing the edge (FIG. 8(*c*)), a kill-vertex-edge operation is performed to delete the vertex together with the edge (step 440).

(e) Finally, a merge edge operation is performed for the vertexes stored in the vertex ID table to delete the vertexes in the table (step 450).

The above described processing corresponds to the reverse operation of the previously mentioned topological transformation, and as a result, topological data are recovered.

B. Processing for Geometric Data

Although the topological data have been explained, a 3D geometric model should be processed by using topological data and geometric data, and the processing for geometric data will now be explained.

B1. Normal Processing

When a progressive transfer is not performed, geometric data is transmitted in accordance with topological data. That is, geometric data for vertexes are transmitted in the ascending order (in order of generation) of the indexes of the vertexes. However, geometric data for vertexes registered in the vertex ID table need not be transmitted. Similarly, data for edges are transmitted in the ascending order of the indexes of the edges. When edges are combined as a result of the topological transformation, an edge having either a smaller index or a larger index is regarded as the index for the combined edges, and geometric data for that index is transmitted. Again, geometric data for edges registered in the edge ID table need not be transmitted. For transmission of geometric data for edges, a case where the directions of the edges must be designated may happen (for example, for a case where there are two interpretations, one for a large arc and one for a small arc). In this case, the ascending direction (or the opposite direction) for the indexes of the vertexes at both ends of the edge is determined to be the positive direction. The direction is expressed by a one-bit flag, and the data for the direction is transmitted with the geometric data for the edge. Geometric data for faces is also transmitted in the ascending order of the indexes of the faces. If the obverse side should be distinguished from the reverse side of the face, since a counterclockwise loop for each triangle is obtained at the step of recovering a triangle mesh, the counterclockwise direction is determined to be the positive direction, and information concerning whether they are positive or negative is transmitted with the geometric data of the faces. When correspondence between a UV curve and a boundary edge is necessary in a trimmed NURBS, the starting point for the loop may be determined to be a vertex having the smallest index.

Geometric data can be transmitted separately from topological data; however, the geometric data may be transmitted with the topological data, at the same time, or may be transmitted either before or after the topological data.

The geometric data can be compressed using conventional Hoffman coding or delta coding. When it is compressed, however, it should be decompressed before it is used.

In addition, when a 3D geometric model is stored instead of being transferred, geometric data corresponding to topological data are read from a storage unit using a normal 3D CAD system function, and also are displayed using a normal function.

B2. Progressive Transfer

When the topological data are compressed, the quantity of geometric data will be much larger than the quantity of the topological data. Even when the geometric data is compressed as previously mentioned, there is a large difference in quantity. The present invention proposes the transmission of all the topological data and then the step-by-step transmission of the geometric data.

In order to transmit the geometric data step-by-step, the data must be processed hierarchically. As previously mentioned, in this process, first, expressions of vertex coordinates, curved lines and curved surfaces are processed hierarchically. For example, the set of coordinate values $P=\{pI, \ldots, pN\}$ (N is the number of coordinate values) is represented as $P^{(n)}=f_p(P^1, \ldots, P^n)$ ($P^k$ indicates data at level k and $P^{(n)}$ indicates the coordinate value calculated when data at the n-th level is transmitted). Similarly, the set of curved lines $C=\{cj\}$ and the set of curved surfaces $S=\{sk\}$ are represented as $C^{(n)}=f_x(C^1, \ldots, C^n)$ and $S^{(n)}=f_S(S^1, \ldots, S^n)$. In this invention, an arbitrary hierarchical method can be employed.

Figure 9:
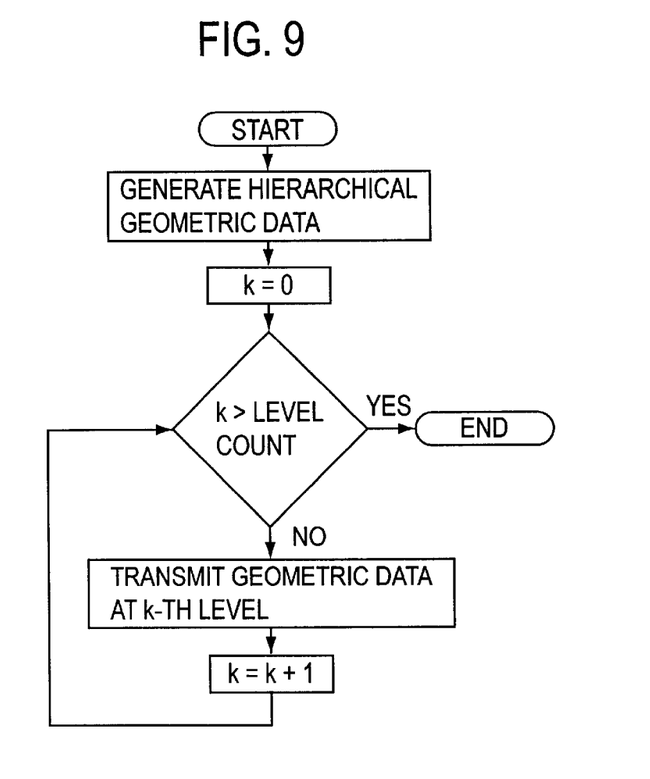
FIG. 9 is a flowchart to illustrate a progressive transfer.

The geometric data is transmitted to a transmission destination in sequential order beginning with data at level 1. The transmission destination recovers a 3D geometric model at each level by using the topological data that have been recovered and the geometric data that have been received, and displays the model. As a result, a 3D geometric model can be displayed step-by-step ranging from low precision to high precision. This processing is briefly shown in FIG. 9.

The above embodiment is merely one example. Modifications, such as one where the loop is determined to be counterclockwise instead of clockwise, or one where the descending direction of indexes is positive, fall within the technical scope of the present invention.

Figure 10:
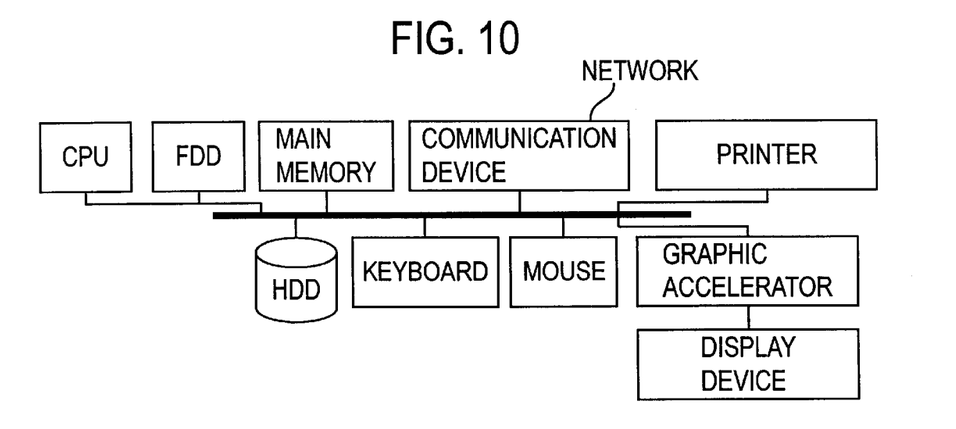
FIG. 10 is a diagram for explaining an ordinary computer system.

The above described processing can be embodied as a normal computer program. This computer program can be employed in a computer system, such as shown in FIG. 10, for example, where the computer program and necessary data are stored on a hard disk drive HDD, and are loaded, as needed, to a main memory and executed by a CPU. A program required for the conventional 3D CAD system can also be provided as the same manner. Data can be input at a keyboard, or can be obtained from a storage medium, such as a floppy disk drive FDD, or across a communication line (network) to which the computer system is connected by a communication device. The computer program may even be transmitted from another computer system. Similarly, the computer program may be provided on a storage medium, such as an FDD or a CD-ROM. The result obtained by the processing according to this invention is employed for numerical analysis by using another computer program stored on the HDD, etc. The result can be provided for a user by a display device or a printer. The system shown in FIG. 10 is merely one example, and a system having a plurality of CPUs may be employed.

In addition, the present invention can be applied for special apparatus. For example, modules for executing the individual steps of the above processing can be prepared, and the result can be output by exchanging the data in the modules. Further, modules for executing two or more of the steps described above can be prepared, or two or more modules can be employed to execute one of the steps.

As described above, it is possible to perform lossless data compression for a 3D geometric model that includes a solid model and a surface model.

Further, it is possible to provide a data compression method for topological structures of various geometric models.

In addition, it is possible to enable high speed transfer of geometric data and reduction of the disk memory capacity required for the storage of geometric data.

Furthermore, it is possible to enable the progressive transfer (display) of a 3D geometric model.

What is claimed is:

1. A method for transmitting a three-dimensional (3D) geometric model composed of faces comprising the steps of:
performing a topological transformation of topological data for each face of 3D geometric model and generating a triangle mesh;
compressing said triangle mesh to generate compressed topological data;
generating operation data associated with the performed topological transformation; and
transmitting said compressed topological data and said operation data;
wherein said topological transformation comprises the steps of:
registering edges if edges are added during said topological transformation; and
registering edges and vertexes for an external loop if a loop in a face is linked with said external loop.

2. The method according to claim 1, further comprising a step of transmitting geometric data of said 3D geometric model.

3. The method according to claim 2, wherein said step of transmitting said geometric data includes the steps of:
transmitting geometric data for vertexes, except for those added during said topological transformation, in order in which said vertexes are generated when said compressed topological data is decompressed to said triangle mesh; and
transmitting geometric data for edges, except for those added during said topological transformation, in order in which said edges are generated when said compressed topological data is decompressed to said triangle mesh.

4. The method according to claim 2, wherein said step of transmitting said geometric data includes the steps of:
generating hierarchical expressions of said geometric data; and
transmitting said geometric data at each level from the geometric data at the highest level to that at the lowest level.

5. The method according to claim 1, wherein said operation data includes data for edges and vertexes that are added by said topological transformation.

6. The method according to claim 1, wherein said step of generating said operation data includes the steps of:
making an ID for an edge in the generated triangle mesh identical to an ID for a registered corresponding edge; and
making an ID for a vertex in the generated triangle mesh identical to an ID for a registered corresponding vertex.

7. The method according to claim 6, further comprising a step of providing indexes to edges and vertexes in order in which said edges and vertexes are generated when said compressed topological data is decompressed to said triangle mesh.

8. The method of claim 1, wherein said topological transformation further comprises the step of registering vertexes if vertexes are added during said topological transformation.

9. An apparatus for transmitting a three-dimensional (3D) geometric model composed of faces, comprising:
a module for performing a topological transformation for topological data for each face of said 3D geometric model and generating a triangle mesh;
a module for compressing said triangle mesh to generate compressed topological data;
a module for generating operation data associated with the performed topological transformation; and
a transmission module for transmitting said compressed topological data and said operation data;
wherein said topological transformation comprises:
a process for registering edges if edges are added during said topological transformation; and
a process for registering edges and vertexes for an external loop if a loop in a face is linked with said external loop.

10. The apparatus according to claim 9, wherein said transmission module transmits geometric data of said 3D geometric model.

11. The apparatus according to claim 9, wherein said module for generating said operation data includes:
means for making an ID for an edge in the generated triangle mesh identical to an ID for a registered corresponding edge; and
means for making an ID for a vertex in the generated triangle mesh identical to an ID for a registered corresponding vertex.

12. The apparatus according to claim 11, further comprising means for providing indexes to edges and vertexes in order in which said edges and vertexes are generated when said compressed topological data is decompressed to said triangle mesh.

13. The apparatus according to claim 10, wherein said transmission module includes:
means for generating hierarchical expressions of said geometric data; and
means for transmitting said geometric data at each level from the geometric data at the highest level to that at the lowest level.

14. The apparatus of claim 9 wherein said topological transformation performed by said module for performing a topological transformation further comprises a process for registering a vertex if vertexes are added during said topological transformation.

15. A method for transmitting a three-dimensional (3D) geometric model composed of faces comprising the steps of:
performing a topological transformation for topological data for each face of said 3D geometric model and generating a triangle mesh;
compressing said triangle mesh to generate compressed topological data;
generating operation data associated with the performed topological transformation;
transmitting said compressed topological data and said operation data; and
transmitting geometric data of said 3D geometric model;
wherein said step of transmitting said geometric data includes the steps of:
transmitting geometric data for vertexes, except for those added during said topological transformation, in order in which said vertexes are generated when said compressed topological data is decompressed to said triangle mesh; and
transmitting geometric data for edges, except for those added during said topological transformation, in order in which said edges are generated when said compressed topological data is decompressed to said triangle mesh.

* * * * *